United States Patent [19]
Hawkes et al.

[11] Patent Number: 6,005,303
[45] Date of Patent: Dec. 21, 1999

[54] LINEAR VOLTAGE REGULATOR COMPATIBLE WITH BIPOLAR AND MOSFET PASS DEVICES AND ASSOCIATED METHODS

[75] Inventors: Charles E. Hawkes, Cary; Thomas A. Jochum, Durham, both of N.C.

[73] Assignee: Intersil Corporation, Palm Bay, Fla.

[21] Appl. No.: 09/108,059

[22] Filed: Jun. 30, 1998

[51] Int. Cl.[6] .................................................. H02J 1/10
[52] U.S. Cl. ........................... 307/44; 307/48; 323/284; 363/78
[58] Field of Search ............................. 307/44, 48, 80, 307/85, 86, 87, 45; 323/265, 266, 273, 274, 275, 281, 284; 363/74, 77, 78, 80, 89

[56] References Cited

U.S. PATENT DOCUMENTS

| | | | |
|---|---|---|---|
| 4,958,268 | 9/1990 | Nagagata et al. | 363/16 |
| 5,264,780 | 11/1993 | Bruer et al. | 323/222 |
| 5,528,127 | 6/1996 | Streit | 323/269 |
| 5,532,918 | 7/1996 | Mayrand et al. | 363/89 |
| 5,834,925 | 11/1998 | Chesavage | 307/58 |
| 5,916,313 | 6/1999 | Brown | 713/300 |

OTHER PUBLICATIONS

Harris Semiconductor Product Sheet HIP6017, "Advanced PWM and Dual Linear Power Control", pp. 1–15.
Harris Semiconductor Product Sheet HIP6018, "Advanced PWM and Dual Linear Power Control", pp. 1–15.
Harris Semiconductor App Note No. AN9805, Desktop Microprocessor Computer Power Systems Using the HIP6018 Controller (HIP6018EVAL1), pp. 1–12.
Harris Semiconductor App Note No. AN9800.1, "Total Power Conversion Solutions for Computer Motherboards Using the HIP6017 and HIP6019 Controller ICs", pp. 1–11.

*Primary Examiner*—Jeffrey Gaffin
*Assistant Examiner*—Peter Zura
*Attorney, Agent, or Firm*—Allen, Dyer, Doppelt, Milbrath & Gilchrist, P.A.

[57] ABSTRACT

A linear voltage regulator includes a pass device for supplying current to a load, and an error amplifier for generating a control signal for controlling the pass device for regulating an output voltage at the load. The error amplifier is connected to a first power supply having a first voltage and a second power supply having a second voltage greater than the first voltage. The error amplifier preferably includes an output stage for providing a greater amount of current to the pass device from the first power supply than from the second power supply when the control signal is below a predetermined value, and for providing a greater amount of current to the pass device from the second power supply than the first power supply when the control signal is above the predetermined value. The predetermined value may be slightly above the typical drive or control voltage needed for a bipolar pass device. Accordingly, the linear regulator can provide a relatively large amount of current for a bipolar transistor from primarily the lower voltage power supply, and can provide a higher voltage for a MOSFET from the higher voltage power supply.

42 Claims, 4 Drawing Sheets

LINEAR VOLTAGE REGULATOR COMPATIBLE WITH BIPOLAR AND MOSFET PASS DEVICES AND ASSOCIATED METHODS

FIELD OF THE INVENTION

The present invention relates to the field of power supplies, and, more particularly, to a linear voltage regulator power converter.

BACKGROUND OF THE INVENTION

DC-to-DC power converters are widely used to supply power to electronic devices, such as computers, printers, etc. Such DC-to-DC converters are available in a wide variety of configurations for many different applications. For example, a relatively sophisticated DC-to-DC converter in integrated circuit form is available from Harris Corporation, the assignee of the present invention, under the model number HIP 6017. In fact, the HIP 6017 monitors and precisely controls three different output voltage levels for use in high performance microprocessor and computer applications.

The HIP 6017 integrated circuit includes a pulse width modulation (PWM) controller, a linear regulator, and a linear controller to provide the three outputs. In addition, the HIP 6017 integrated circuit includes the associated monitoring and protection functions. The PWM controller regulates the microprocessor core voltage with a synchronous-rectified buck converter. The linear controller regulates power for the so-called "GTL bus" or microprocessor bus of the computer, and the linear regulator provides power for the clock driver circuits.

A typical integrated linear regulator circuit, such as provided by one portion of the HIP 6017, is connected to and controls an external semiconductor pass device, such as a metal-oxide field-effect transistor (MOSFET). The MOSFET, for example, may be controlled to provide a regulated lower output voltage, such as 1.5 V, from a higher voltage input, such as 3.3 V. The gate of the MOSFET is driven by an error amplifier. The error amplifier is connected to the bias supply, such as 12 V for a typical computer application.

The error amplifier also has an inverting input connected to a resistive voltage divider for sensing the output or load voltage, and a non-inverting input connected to a voltage reference. For this example using a MOSFET pass device, the error amplifier needs to supply a control voltage in a range of about 0 to 12 volts, but at a relatively small current in a range of only about 5 milliamps regardless of the load current.

Other linear regulators are also used wherein an external NPN bipolar pass device is used as the pass device. In such a regulator, the error amplifier, more particularly the output stage of the error amplifier, need only supply a relatively modest voltage of about 0 to 2.5 V, for example. However, the current necessary to drive the base of the external NPN transistor is much higher than for the MOSFET pass device when the output load current is high. For example, with an output load current of 2 to 10 amps, the base drive current may be up to 50 mA.

If the linear regulator including the error amplifier coupled to the 12 V supply is used to drive the NPN bipolar device, the power dissipation on the integrated circuit will be 50 mA×12 V or 0.6 Watts. This is a relatively large amount of power, especially considering that there are typically other power dissipating circuits on the same integrated circuit chip, such as is the case for the HIP 6017, for example. In comparison, when the linear regulator is connected to an external MOSFET pass device, the power dissipation is only 5 mA×12 V or only 60 mW. Moreover, there are significant reasons why the circuit designer may wish to use the NPN bipolar transistor as the pass device rather than the MOSFET. Unfortunately, present linear regulator circuits that are also compatible for MOSFET pass devices may produce an unacceptably high power dissipation, because drive current is delivered from a relatively high supply voltage for compatibility with the MOSFET pass device.

SUMMARY OF THE INVENTION

In view of the foregoing background, it is therefore an object of the present invention to provide a linear regulator that is compatible with either a MOSFET or bipolar pass device and which does not suffer from increased power dissipation when driving the bipolar pass device.

This and other objects, features and advantages in accordance with the present invention are provided by a linear voltage regulator comprising a pass device for supplying current to a load, and an error amplifier for generating a control signal for controlling the pass device for regulating an output voltage at the load. The error amplifier is preferably connected to a first power supply having a first voltage and a second power supply having a second voltage greater than the first voltage. Moreover, the error amplifier preferably includes an output stage for providing a greater amount of current to the pass device from the first power supply than from the second power supply when the control signal is below a predetermined value, and for providing a greater amount of current to the pass device from the second power supply than the first power supply when the control signal is above the predetermined value.

The predetermined value may be slightly above the typical drive or control voltage needed for a bipolar pass device. Accordingly, the error amplifier can provide a relatively large amount of current for a bipolar transistor from primarily the lower voltage power supply, and can provide a higher voltage for a MOSFET from the higher power supply. In other words, current from the higher voltage power supply is only used when the lower power supply is no longer capable of providing the needed control signal voltage. The linear regulator circuit in accordance with the invention is thus compatible with either type of pass device without causing unwanted power dissipation, for example, when using a bipolar device.

In one embodiment, the output stage of the error amplifier may provide current from both the first and second power supplies in a value range adjacent the predetermined value of the control signal. In other words, the cross-over between the two power supplies can be more gradual rather than abrupt to thereby provide a smooth transition between the power supplies.

The output stage in one embodiment also preferably provides at least a portion of the current from the second power supply to the pass device when the control signal is below the predetermined value. The output stage may preferably provide greater than about 80 percent of the current from the first supply when the control signal is below the predetermined value. In addition, the output stage may provide substantially no current from the first power supply when the control signal is above the first value.

The error amplifier may include at least one other stage for generating an error signal coupled to the output stage.

Accordingly, the output stage may also include a first circuit for providing a first portion of the current to the pass device from the first power supply and based upon the error signal, and a second circuit for providing a second portion of the current to the pass device and also based upon the error signal. For example, the first circuit may include a first transistor connected between the first power supply and the pass device, and the second circuit may include a second transistor connected between the second power supply and the pass device.

In accordance with another embodiment of the invention, the output stage may include a control output circuit for generating the control signal. In this variation, a switch is provided for switching the control output circuit to provide current to the pass device from one of the first and second power supplies.

According to another aspect of the invention, the linear regulator may be included in an electronic device, such as a personal computer, which includes a first load to be supplied from the linear regulator as described above. The electronic circuit may also include one or more other loads which are supplied by other respective regulators on the same chip as the first linear regulator. For example, the integrated circuit may include a second linear regulator and/or a pulse width modulator regulator for respective loads at different voltages.

A method aspect of the invention is for linearly regulating an output voltage at a load using a pass device connected to the load and an error amplifier connected to control the pass device. The error amplifier is preferably connected to a first power supply having a first voltage, and to a second power supply having a second voltage greater than the first voltage. The method preferably comprises the step of generating a control signal to control the pass device for linearly regulating the output voltage at the load by using the error amplifier to provide a greater amount of current to the pass device from the first power supply than from the second power supply when the control signal is below a predetermined value, and to provide a greater amount of current to the pass device from the second power supply than the first power supply when the control signal is above the predetermined value.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
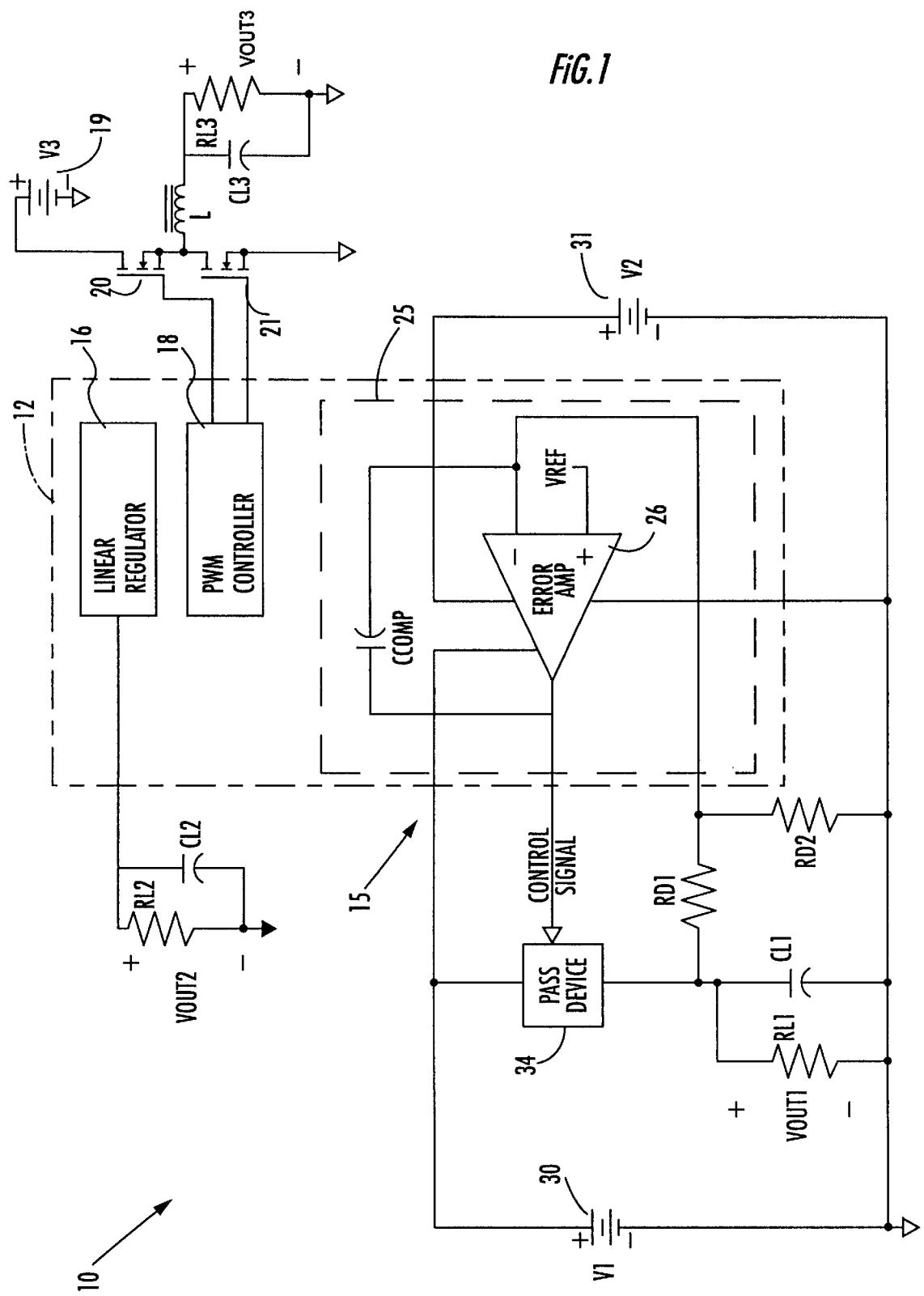
FIG. 1 is a schematic circuit diagram of computer power supply including a DC-to-DC converter integrated circuit including the linear regulator circuit in accordance with the present invention.

Turning now to FIG. 1 an overall electronic circuit 10 including the linear regulator 15 in accordance with the invention is now described. The illustrated circuit or device 10 may be a personal computer, for example, where a number of loads are supplied regulated power from an integrated circuit 12 including the linear regulator 15. Of course, the linear regulator 15 can be used in many other applications as will be readily appreciated by those skilled in the art.

The circuit includes a second linear regulator 16 coupled to a second load schematically illustrated by the load resistor RL2 and load capacitor CL2. For example, the second load may be the clock driver circuits of a personal computer motherboard, and the voltage VOUT2 may be about 2.5V.

A pulse width modulation controller 18 and associated components may also be provided, such as to power the GTL bus of a personal computer as will be readily understood by those skilled in the art. The associated components illustratively include upper and lower MOSFET switches 20, 21, an inductor L, and a third power source 19 supplying a third voltage V3. The third load is represented by the load resistor RL3 and the load capacitance CL3. An output voltage VOUT3 settable in a range of about 1.8 to 3.5V may be provided by this circuit portion.

The linear regulator 15 illustrated in the lower portion of FIG. 1 includes the linear regulator controller circuitry 25 on the integrated circuit 12, as well as external components. More particularly, the linear regulator 15 includes an error amplifier 26 having an inverting input connected to an output voltage sensing divider provided by series connected resistors RD1, RD2 as will be appreciated by those skilled in the art. The non-inverting input of the error amplifier 26 is connected to a voltage reference, and a compensation capacitor CCOMP is connected between the output and inverting input of the error amplifier 26 as will also be appreciated by those skilled in the art. The first load is schematically illustrated by the resistor RL1 and capacitor CL1.

The linear regulator 15 is illustratively connected to a first power supply 30 and to a second power supply 31. The first power supply 30 may provide a first voltage V1, and the second power supply 31 may provide a second voltage V2 greater than the first voltage. For example, for a typical application, such as for a personal computer, and where the desired output voltage VOUT1 is 1.5V, the first voltage V1 may be 3.3V, and the second voltage V2 may be 12V.

In the illustrated embodiment the control signal from the error amplifier 26 is coupled to a generically illustrated pass device 34. The pass device 34 will typically be either a MOSFET or a bipolar transistor as will be described in greater detail below. The pass device 34 provides current from the first power supply 30 to the first load under the control of the error amplifier 26 to thereby maintain the desired output voltage despite fluctuations in the load. The error amplifier 26 is also connected to the second power supply 31 to supply current to the pass device 34 from the second power supply as will now be explained.

Figure 2:
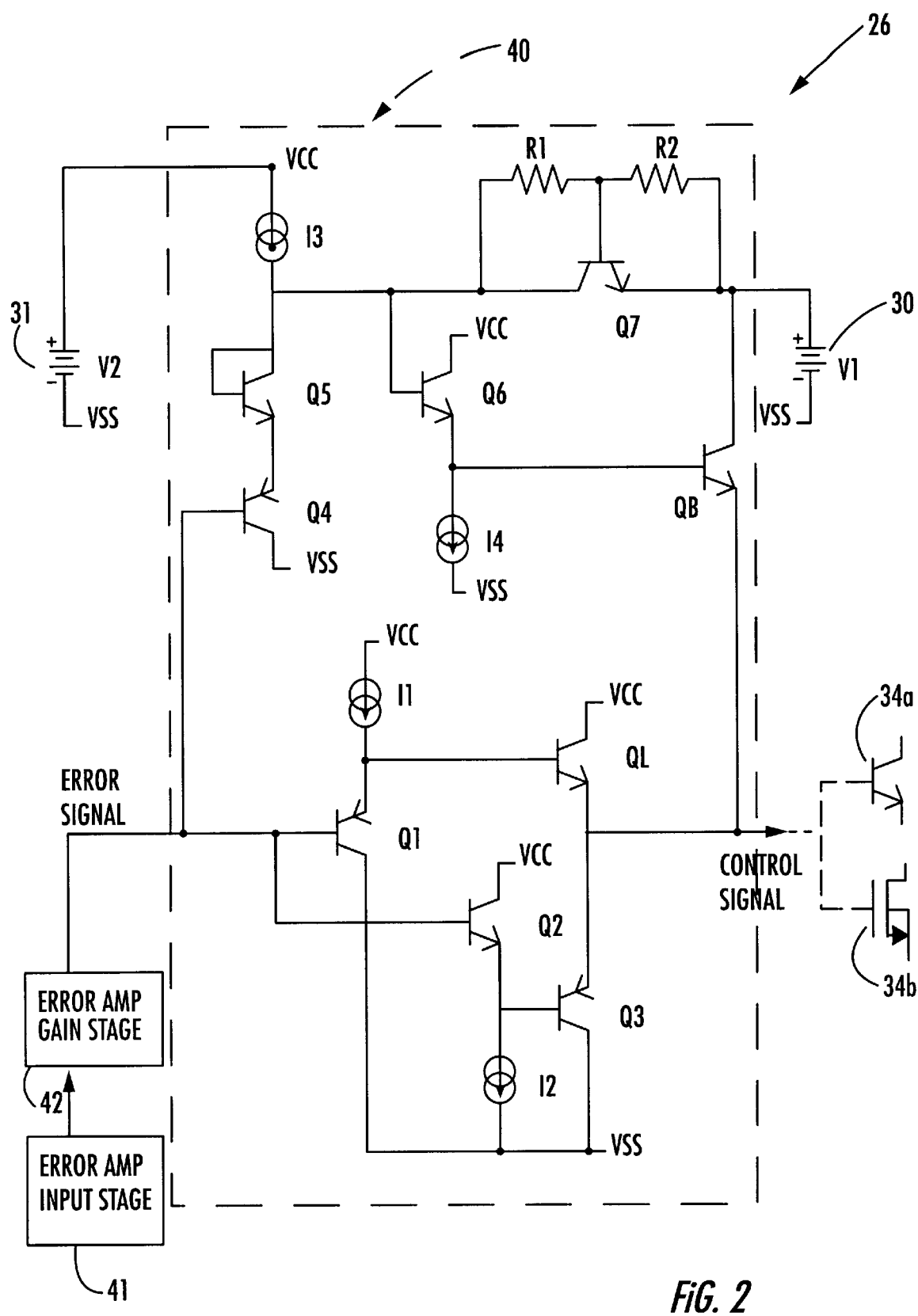
FIG. 2 is a more detailed schematic circuit diagram illustrating an embodiment of the output stage of the error amplifier as shown in FIG. 1
Figure 3:
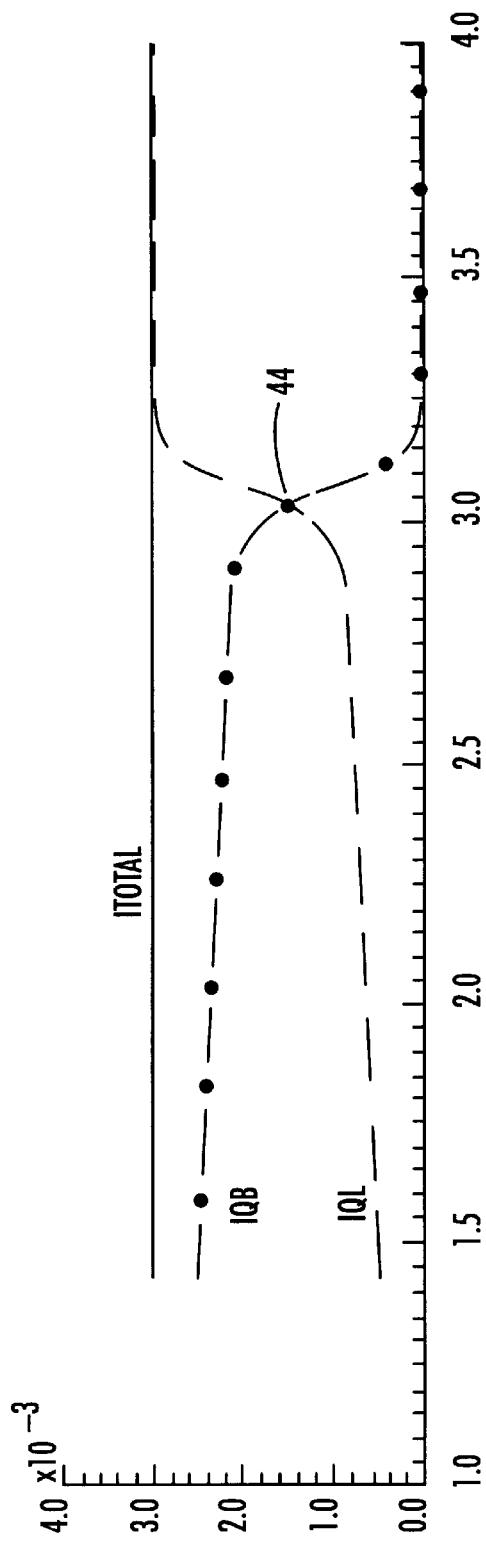
FIG. 3 is a graph of the respective current contributions versus drive or control voltage for the two circuit portions of the output stage as shown in FIG. 2 and for an example where the total current is 3 mA.
Figure 4:
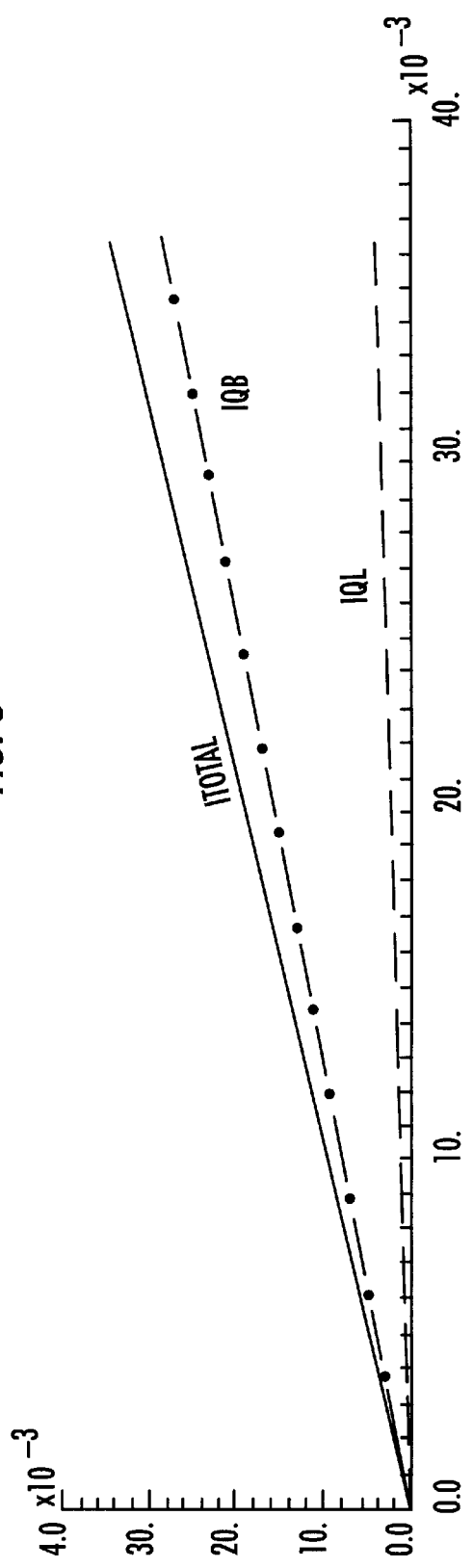
FIG. 4 is a graph of the respective current contributions versus current for the two circuit portions of the output stage as shown in FIG. 2 and for an example where the drive or control voltage is 1.5V.

Referring now additionally to FIGS. 2–4, the operation and advantageous features of the error amplifier 26 will be described. The error amplifier 26 illustratively includes an output stage 40 which provides the control or drive signal to the pass device, which may advantageously be either a bipolar transistor 34a, or a MOSFET 34b. The amplifier 26 also illustratively includes an input stage 41 and a gain stage 42 as will be readily appreciated by those skilled in the art. The gain stage 42 produces an error signal for use by the output stage 40 in the illustrated embodiment.

The output stage 40 includes circuitry for providing a greater amount of current to the pass device 34 from the first power supply 30 than from the second power supply 31 when the control signal is below a predetermined value, and for providing a greater amount of current to the pass device from the second power supply than the first power supply when the control signal is above the predetermined value. The predetermined value may be slightly above the typical drive or control voltage needed for a bipolar pass device.

The predetermined value defines a cross-over point 44 which is readily appreciated to be just slightly above 3.05V in the example as plotted in FIG. 3. More particularly, as shown in FIG. 3 the total current ITOTAL of the control signal is 3 mA as shown by the solid horizontal line. The respective current contributions from the transistor QB and transistor QL are shown by the plots labeled IQB and IQL as will be described in greater detail below.

The linear regulator 15 and, more particularly, the error amplifier 26 in accordance with the present invention can provide a relatively large amount of current for the bipolar transistor 34a from primarily the lower voltage power supply V1, and can provide a higher voltage for the MOSFET 34b from the higher power supply V2. The linear regulator 15 is compatible with either type of pass device without causing unwanted power dissipation in sharp contrast to conventional linear regulator circuits, such as used in the HIP 6017 described above.

The output stage 40 of the error amplifier 26 also provides current from both the first and second power supplies 30, 31 in a value range adjacent the predetermined value of the control signal. As shown in FIG. 3, current is drawn from both supplies from the cross-over point 44 of about 3.05V up to about 3.15V. The output stage 40 may provide substantially no current from the first power supply 30 when the control signal is at 3.15V and above. On the lower side of the cross-over point 44, both supplies provide current with IQB being the larger component. Accordingly, the shifting from the power supplies can be more gradual rather than abrupt to thereby provide a smooth transition between the first and second power supplies.

In the illustrated embodiment, the error amplifier 26 includes stages 42, 41 which produce an error signal coupled to the output stage 40. As will be readily appreciated by those skilled in the art, the error signal is generated based upon a difference between a reference voltage VREF and the output or load voltage VOUT1. The output stage 40 includes a first circuit for providing a first portion of the current to the pass device 34 from the first power supply 30 and based upon the error signal, and a second circuit for providing a second portion of the current from the second power supply 31 to the pass device and also based upon the error signal.

The first circuit includes transistors Q4, Q5, Q6, Q7 and QB. Bipolar transistor Q4 has its base connected to the error signal, its collector connected to VSS, and its emitter connected to the emitter of transistor Q5. Transistor Q5 has its base and collector connected together and to the second power supply through a current source 13. The node between the current source 13 and the base/collector of transistor Q5 is connected, in turn, to the base of the transistor Q6. Transistor Q6 has its emitter connected to VSS through a current source 14, and its collector coupled to the second power supply 31.

Transistor Q7 and resistors R1, R2 provide an antisaturation clamp for transistor QB as will be appreciated by those skilled in the art. More particularly, resistor R1 is connected between the base of transistor Q7 and its collector which, in turn, is also connected to the base of transistor Q6 and to the node defined between the current source 13 and the base/collector of transistor Q5. Resistor R2 is connected between the base and emitter of transistor Q7. The first power supply 30 is also connected to the emitter of transistor Q7.

Transistor QB has its base connected to the emitter of transistor Q6, its collector coupled to the first power supply 30, and its collector connected to the output which feeds the pass device 34. Transistor QB is controlled by the other associated components to provide the current component IQB as explained above and as illustrated in the example plotted in FIG. 3. In other words, transistor QB is a first transistor connected between the first power supply 30 and the pass device 34 to control the supply of current from the first supply to the pass device. When a relatively large control or drive current is required at a relatively low voltage, as would be the case for the bipolar transistor 34a as the pass device, the transistor QB provides most of the power from the lower supply voltage. This means that relatively little current is supplied from the second power supply 31 for the bipolar transistor 34a, and, therefore power dissipation on the integrated circuit chip is thereby greatly reduced. For example, as shown in FIG. 4, with a drive or control voltage of 1.5V, as would be the case for a bipolar transistor 34a, and at a total drive or control current of 30 mA, the current IQB from transistor QB (from the lower first power supply 30) is about 25 mA, and the current IQL from the transistor QL (from the higher second power supply 31) is only about 5 mA. In this instance slightly more than 80% of the current is from the lower voltage power supply 30.

The lower portion of the schematic diagram of FIG. 2 illustrates the second circuit which provides the predominant current IQL for the pass device, in particular a MOSFET 34b, when the control voltage is above the predetermined value. The second circuit includes transistors Q1, Q2, Q3 and QL arranged in standard Class AB output stage as would be appreciated by those skilled in the art. In particular, the base of the transistor Q1 is connected to receive the error signal and is also connected to the base of transistor Q2. The emitter of transistor Q1 is connected to the second power supply 31 via the illustrated current source I1. The collector of transistor Q1 is connected to VSS. The collectors of both transistors Q2 and Q1 are also connected to the second power supply 31. The emitter of transistor Q2 is connected to VSS through the illustrated current source 12. The base of transistor Q3 is connected to the emitter of transistor Q2, and the collector of transistor Q3 is connected to VSS. The drive or control signal is generated by the combination of the current contributions of the first and second circuits. Of course the current from the first supply 30 goes to zero when the control signal is high, because current cannot flow backwards through the transistor QB as will be readily appreciated by those skilled in the art.

Figure 5:
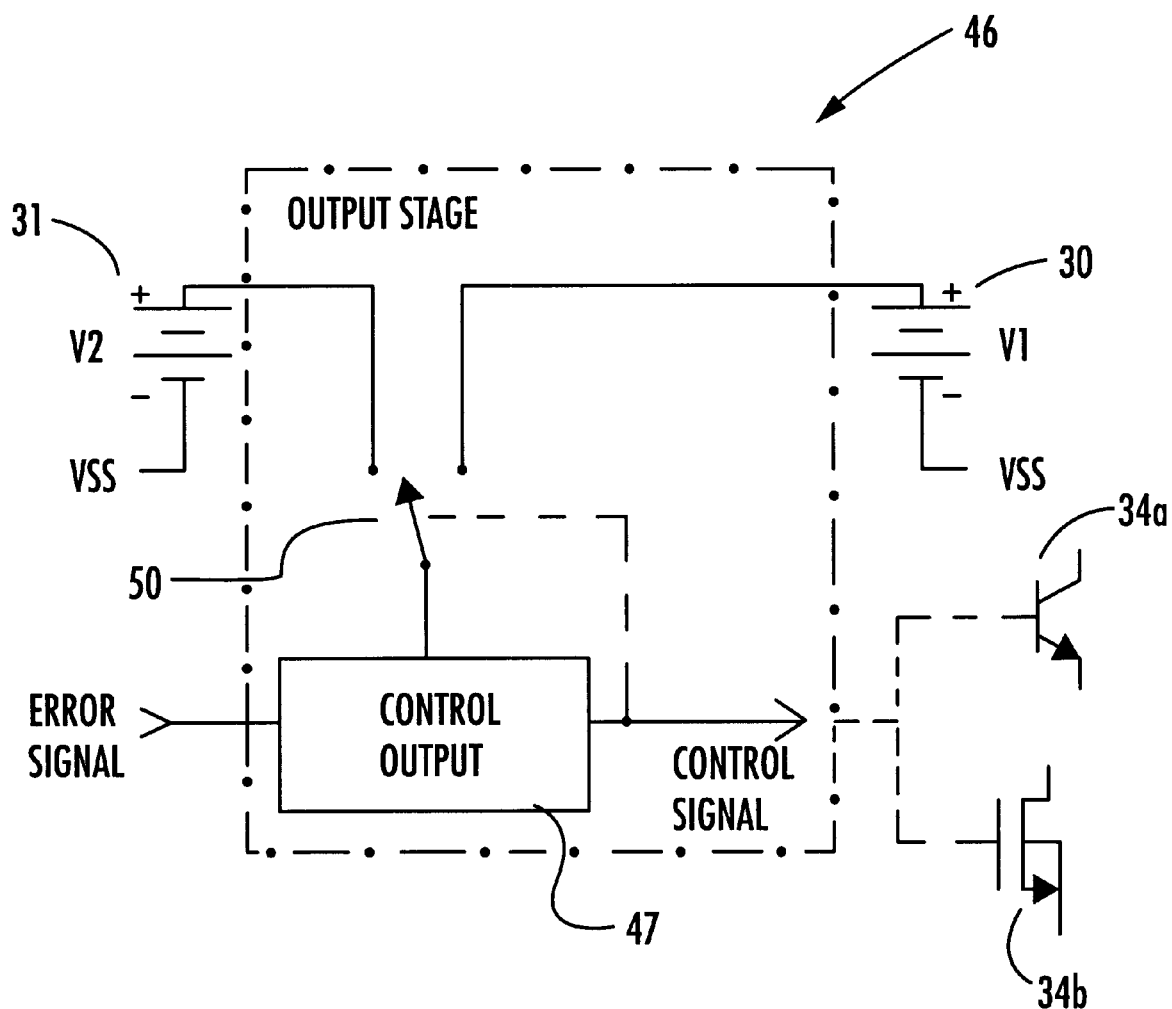
FIG. 5 is schematic diagram of an alternative embodiment of an output stage of an error amplifier in accordance with the present invention.

Turning now additionally to the circuit portion shown in FIG. 5 another embodiment of an output stage 46 is now described. The output stage 46 illustratively includes a control output circuit 47 for generating the control signal. In this variation, a switch 50 is provided for switching the control output circuit to provide current to the pass device 34a, 34b from one of the first power supply 30 or the second power supply 31. As would be readily understood by those skilled in the art, hysteresis could be provided about the switching point. Accordingly, this output stage 46 may also be used in an error amplifier of a linear regulator to provide the advantages and features described herein.

A method aspect of the invention is for linearly regulating an output voltage at a load using a pass device connected to the load VOUT1 and an error amplifier 26 connected to control the pass device 34. The error amplifier 26 is preferably connected to a first power supply 30 having a first voltage V1 and to a second power supply 31 having a second voltage V2 greater than the first voltage. The method preferably comprises the step of generating a control signal to control the pass device 34 for linearly regulating the output voltage at the load by using the error amplifier 26 to provide a greater amount of current to the pass device from the first power supply than from the second power supply when the control signal is below a predetermined value, and to provide a greater amount of current to the pass device from the second power supply than the first power supply when the control signal is above the predetermined value.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A linear voltage regulator comprising:
   a pass device for supplying current to a load; and
   an error amplifier for generating a control signal for controlling said pass device for regulating an output voltage at the load, said error amplifier being connected to a first power supply having a first voltage and to a second power supply having a second voltage greater than the first voltage;
   said error amplifier comprising an output stage for providing a greater amount of current to said pass device from the first power supply than from the second power supply when the control signal is below a predetermined value, and for providing a greater amount of current to said pass device from the second power supply than the first power supply when the control signal is above the predetermined value.

2. A linear voltage regulator according to claim 1 wherein said pass device comprises one of a bipolar transistor and a metal-oxide semiconductor field-effect transistor (MOSFET).

3. A linear voltage regulator according to claim 1 wherein the predetermined value is a predetermined voltage.

4. A linear voltage regulator according to claim 1 wherein said output stage provides current from both of the first and second power supplies in a value range adjacent the predetermined value of the control signal to thereby provide a smooth transition between the first and second power supplies.

5. A linear voltage regulator according to claim 1 wherein said output stage provides at least a portion of the current to said pass device from the second power supply when the control signal is below the predetermined value.

6. A linear voltage regulator according to claim 1 wherein said output stage provides greater than about 80 percent of the current to said pass device from the first power supply when the control signal is below the predetermined value.

7. A linear voltage regulator according to claim 1 wherein said output stage provides substantially no current to said pass device from the first power supply when the control signal is above the first value.

8. A linear voltage regulator according to claim 1 wherein said error amplifier comprises at least one other stage for generating an error signal coupled to said output stage.

9. A linear voltage regulator according to claim 8 wherein said output stage comprises:
   a first circuit for providing a first portion of the current to said pass device from the first power supply and based upon the error signal; and
   a second circuit for providing a second portion of the current to said pass device and based upon the error signal.

10. A linear voltage regulator according to claim 9 wherein said first circuit comprises a first transistor connected between the first power supply and said pass device; and wherein said second circuit comprises a second transistor connected between the second power supply and said pass device.

11. A linear voltage regulator according to claim 1 wherein said output stage comprises:
   a control output circuit for generating the control signal; and
   a switch for switching the control output circuit to provide current to said pass device from one of the first and second power supplies.

12. A linear voltage regulator according to claim 1 further comprising a voltage sensor connected between said error amplifier and the load.

13. A linear voltage regulator according to claim 12 wherein said voltage sensor comprises a resistive voltage divider.

14. A linear voltage regulator according to claim 1 wherein said error amplifier comprises an input stage having an inverting input connected to said voltage sensor, and a non-inverting input connected to a reference voltage.

15. A linear voltage regulator according to claim 1 wherein said pass device is connected to the first power supply for providing current to the load.

16. A linear voltage regulator for regulating an output voltage at a load, the linear voltage regulator comprising:
   a pass device for providing current to the load; and
   an error amplifier for generating a control signal for controlling said pass device for regulating the output voltage at the load, said error amplifier being connected to a first power supply having a first voltage and to a second power supply having a second voltage greater than the first voltage;
   said error amplifier comprising an output stage for providing a greater amount of current to said pass device from the first power supply than from the second power supply when the control signal is below a predetermined voltage, for providing a greater amount of current to said pass device from the second power supply than the first power supply when the control signal is above the predetermined voltage, and for providing current from both of the first and second power supplies in a voltage range adjacent the predetermined voltage of the control signal to thereby provide a smooth transition between the first and second power supplies.

17. A linear voltage regulator according to claim 16 wherein said pass device comprises one of a bipolar transistor and a metal-oxide semiconductor field-effect transistor (MOSFET).

18. A linear voltage regulator according to claim 16 wherein said output stage provides at least a portion of the current to said pass device from the second power supply when the control signal is below the predetermined voltage.

19. A linear voltage regulator according to claim 16 wherein said output stage provides greater than about 80 percent of the current to said pass device from the first power supply when the control signal is below the predetermined value.

20. A linear voltage regulator according to claim 16 wherein said output stage provides substantially no current to said pass device from the first power supply when the control signal is at a voltage above the first voltage.

21. A linear voltage regulator according to claim 16 wherein said error amplifier comprises at least one other stage for generating an error signal coupled to said output stage.

22. A linear voltage regulator according to claim 21 wherein said output stage comprises:
   a first circuit for providing a first portion of the current to said pass device from the first power supply and based upon the error signal; and
   a second circuit for providing a second portion of the current to said pass device and based upon the error signal.

23. A linear voltage regulator according to claim 16 wherein said output stage comprises:
   a control output circuit for generating the control signal; and
   a switch for switching the control output circuit to provide current to said pass device from one of the first and second power supplies.

24. An electronic device comprising:
   a first load;
   a first power supply at a first voltage and a second power supply at a second voltage greater than the first voltage;
   a first linear voltage regulator for regulating an output voltage on said first load, said linear voltage regulator comprising
      a pass device for supplying current to the load, and
      an error amplifier for generating a control signal for controlling said pass device for regulating the output voltage at said first load, said error amplifier comprising an output stage for providing a greater amount of current to said pass device from the first power supply than from the second power supply when the control signal is below a predetermined value, and for providing a greater amount of current to said pass device from the second power supply than the first power supply when the control signal is above the predetermined value.

25. An electronic device according to claim 24 further comprising a second load and a second voltage regulator therefor.

26. An electronic device according to claim 25 wherein said second voltage regulator comprises one of a linear voltage regulator and a pulse width modulation regulator.

27. An electronic device according to claim 24 wherein said pass device comprises one of a bipolar transistor and a metal-oxide semiconductor field-effect transistor (MOSFET).

28. An electronic device according to claim 24 wherein the predetermined value is a predetermined voltage.

29. An electronic device according to claim 24 wherein said output stage provides current from both of the first and second power supplies in a value range adjacent the predetermined value of the control signal to thereby provide a smooth transition between the first and second power supplies.

30. An electronic device according to claim 24 wherein said output stage provides at least a portion of the current to said pass device from the second power supply when the control signal is below the predetermined value.

31. An electronic device according to claim 24 wherein said output stage provides greater than about 80 percent of the current to said pass device from the first power supply when the control signal is below the predetermined value.

32. An electronic device according to claim 24 wherein said output stage provides substantially no current to said pass device from the first power supply when the control signal is above the first value.

33. An electronic device according to claim 24 wherein said error amplifier comprises at least one other stage for generating an error signal coupled to said output stage.

34. An electronic device according to claim 33 wherein said output stage comprises:
   a first circuit for providing a first portion of the current to said pass device from the first power supply and based upon the error signal; and
   a second circuit for providing a second portion of the current to said pass device and based upon the error signal.

35. An electronic device according to claim 34 wherein said first circuit comprises a first transistor connected between the first power supply and said pass device; and wherein said second circuit comprises a second transistor connected between the second power supply and said pass device.

36. An electronic device according to claim 24 wherein said output stage comprises:
   a control output circuit for generating the control signal; and
   a switch for switching the control output circuit to provide current to said pass device from one of the first and second power supplies based upon the control signal.

37. A method for linearly regulating an output voltage at a load using a pass device connected to the load and an error amplifier connected to control the pass device, the error amplifier being connected to a first power supply having a first voltage and to a second power supply having a second voltage greater than the first voltage, the method comprising the step of:
   generating a control signal to control the pass device for linearly regulating the output voltage at the load by using the error amplifier to provide a greater amount of current to the pass device from the first power supply than from the second power supply when the control signal is below a predetermined value, and to provide a greater amount of current to the pass device from the second power supply than the first power supply when the control signal is above the predetermined value.

38. A method according to claim 37 wherein the pass device comprises one of a bipolar transistor and a metal-oxide semiconductor field-effect transistor (MOSFET).

39. A method according to claim 37 wherein the step of generating the control signal comprises generating same by using the error amplifier to provide current from both of the first and second power supplies in a value range adjacent the predetermined value of the control signal to thereby provide a smooth transition between the first and second power supplies.

40. A method according to claim 37 wherein the step of generating the control signal comprises generating same by using the error amplifier to provide at least a portion of the current to the pass device from the second power supply when the control signal is below the predetermined value.

41. A method according to claim 37 wherein said output stage provides greater than about 80 percent of the current to the pass device from said first power supply when the control signal is below the predetermined value.

42. A method according to claim 37 wherein the step of generating the control signal comprises generating same by using the error amplifier to provide substantially no current to the pass device from the first power supply when the control signal is above the first value.

* * * * *

UNITED STATES PATENT AND TRADEMARK OFFICE
CERTIFICATE OF CORRECTION

PATENT NO. : 6,005,303
DATED : December 21, 1999
INVENTOR(S) : Charles E. HAWKES; Thomas A. JOCHUM It is certified that error appears in the above-identified patent and that said Letters Patent is hereby corrected as shown below:

```
Column 5, line 66      Strike: "13"
                       Insert: - -I3 - -

Column 5, line 66      Strike: "13"
                       Insert: - - I3 - -

Column 6, line 3       Strike: "14"
                       Insert: - - I4 - -

Column 6, line 54      Strike: "12"
                       Insert - - I2 - -
```

Signed and Sealed this

Twenty-fourth Day of April, 2001

Attest:

NICHOLAS P. GODICI

Attesting Officer

Acting Director of the United States Patent and Trademark Office